(12) United States Patent
Abe et al.

(10) Patent No.: US 6,405,110 B1
(45) Date of Patent: Jun. 11, 2002

(54) FAILURE DIAGNOSIS APPARATUS AND FAILURE DIAGNOSIS METHOD OF VEHICULAR ELECTRONIC CONTROL SYSTEM

(75) Inventors: Toshiyuki Abe; Yusuke Hara; Akira Yasuda, all of Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/955,429

(22) Filed: Sep. 19, 2001

(30) Foreign Application Priority Data

Sep. 19, 2000 (JP) ........................................ 2000-283855
Sep. 19, 2000 (JP) ........................................ 2000-283856

(51) Int. Cl.$^7$ ................................................ G06F 7/00
(52) U.S. Cl. ........................... 701/29; 701/31; 307/10.1
(58) Field of Search ............................. 701/29, 31, 32, 701/33, 34, 35, 36, 49; 307/9.1, 10.1; 340/310.1

(56) References Cited

U.S. PATENT DOCUMENTS 5,957,985 A * 9/1999 Wong et al. .................. 201/33
5,990,570 A * 11/1999 Yoshida et al. ............. 307/10.1
6,226,574 B1 * 5/2001 Hiramatsu .................... 701/29
6,328,150 B1 * 11/2001 Nitta ............................ 701/29
6,326,704 B1 * 12/2001 Breed et al. ................. 307/9.1

FOREIGN PATENT DOCUMENTS

JP            3-114332 A        5/1991

* cited by examiner

Primary Examiner—Richard M. Camby

(57) ABSTRACT

A failure diagnosis apparatus for diagnosing a failure in a vehicular electronic control system includes a plurality of electronic control related members mounted on a vehicle, a multiple communication line connected to the plurality of electronic control related members as communication elements, such that communication signal information received from the multiple communication line is analyzed by an analyzing portion. A communication system region which may have failed in the multiple communication system is specified based on presence or absence of communication of the electronic control related members, and the electronic control related member which may have failed is specified based on a data content of a communication signal provided from communication information. Respective states are displayed by proper value data and detected value data of the electronic control related members.

8 Claims, 10 Drawing Sheets

FAILURE DIAGNOSIS APPARATUS AND FAILURE DIAGNOSIS METHOD OF VEHICULAR ELECTRONIC CONTROL SYSTEM

CROSS REFERENCE TO RELATED APPLICATIONS

This nonprovisional application incorporates by reference the subject matter of application Ser. Nos. 2000-238356 and 2000-238355 filed on Sep. 19, 2000, on which a priority claim is based under 35 U.S.C. §119(a).

BACKGROUND OF THE INVENTION

1. Field of the Invention

The present invention relates to a failure diagnosis apparatus and a failure diagnosis method for diagnosing failure of a vehicular electronic control system constituted by a plurality of electronic control related members mounted on a vehicle such as an automobile and a multiple communication line connected with the electronic control related members as communication elements.

2. Description of the Related Art

In recent years, in a vehicle such as an automobile, with improvements in basic functions and increases in high functions of the vehicle, the number of electronic control apparatus mounted on the vehicle are increased. As a result, the number of harnesses connected to the electronic control apparatus are considerably increased, increase in size and weight of harnesses are brought about, and thus attachment of harnesses and items surrounding the harnesses has become more difficult.

As a countermeasure, there has been developed a technology for carrying out multiple communication by connecting respective electronic control apparatus by a bus communication line (multiplex communication line) to thereby enable to resolve the above-described drawback. Further, since such a communication line is capable of sharing a large amount of information among the respective electronic control apparatus, more elaborate, control can be achieved.

For example, FIG. 9 is a schematic diagram showing such a vehicular electronic control system constituted by connecting a plurality of electronic control apparatus by a bus communication line. As shown by FIG. 9, there are provided a plurality of ECU (electronic control unit, controller) 101 through 104 as electronic control apparatus, all of the ECU 101 through 104 are connected to a bus communication line 110, and information can be transmitted and received among respective ECU 101 through ECU 104 by multiple communication by way of the bus communication line 110.

The ECU 101 through 104 are front ECU for controlling lamps, wipers and the like at a surrounding of a front portion of a vehicle body, sun roof ECU for controlling operation of a sun roof and so on. Therefore, the ECU 101 through 104 are connected to sensors or switches related to mechanism or control of control objects. In this case, first ECU 101 and second ECU 102 are respectively connected to switches 105 and 106, and third ECU 103 and fourth ECU 104 are respectively connected to motors 107 and 108.

According to such a vehicular electronic control system, when respective ECU (communication element) 101 through 104 are subjected to failure diagnosis, a diagnosis tester 120 is connected to a specific one of a communication element (here, second ECU) 102 and to ECU 102 as a gateway, and failure diagnosis information, transmitted from ECU 102 and ECU 101, 103, and 104 connected to ECU 102 by way of the bus communication line 110, is inputted to the diagnosis tester 120.

That is, when some drawback is caused in the electronic control apparatus related to ECU 101 through 104 constituting communication elements of the vehicular electronic control system, the diagnosis tester 120 is connected to ECU 102, self diagnosis information from the respective communication elements (ECU) 101 through 104 is inputted to the diagnosis tester 120 by way of ECU 102 as the gateway and based on the self diagnosis information, and it is diagnosed at which of the communication elements (ECU) failure is caused.

Further, when respective ECU is not provided with a self-diagnosis function, ECU 102 as the gateway is collectively provided with the self-diagnosis function.

Meanwhile, according to the above-described conventional failure diagnosis method of the vehicular electronic control system, the following problems are posed.

First, the diagnosis tester 120 is transmitted with the self diagnosis information by way of ECU 102 as the gateway and therefore, there is a case in which depending on diagnosis information, it is difficult to find at which of the communication elements (ECU), connected to ECU 102 as the gate way, the failure is present and whether the failure is present in ECU 102 as the gateway, and it is difficult to make clear cause of failure.

Further, although failure includes failure of the communication element (ECU) as well as failure of a signal transmitting system such as disconnection of a signal line or contact failure of a connection terminal, for example, when self diagnosis information is not transmitted, there is a case in which it is difficult to find whether the failure is in the communication element or in the signal transmitting system, and it is difficult to make clear the cause of failure.

Further, according to the conventional failure diagnosis method, the failure diagnosis is carried out based on the transmitted self-diagnosis information. Therefore, failure diagnosis cannot be carried out with regard to a communication element that is not provided with the self-diagnosis function. That is, the bus communication line 110 is connected not only to ECU having the self-diagnosis function, but also to a communication element that is not provided with the self-diagnosis function such as a switch or a sensor. The self-diagnosis information is not outputted from the communication element and therefore, the failure diagnosis cannot be carried out.

Further, when control is carried out based on a large amount of information provided by multiple communication, although finer control can be carried out, when failure is caused, combinations of cause of failure and phenomena of failure become complicated. Therefore, it is necessary to prepare trouble shooting with regard to a very large number of phenomena.

Therefore, not only an increase in a number of pages of an instruction manual of maintenance in cost for generating the instruction manual of maintenance are brought about, but also such a composite drawback per se becomes difficult to deal with.

Further, relationships between failure phenomena and failure causes are complicated and numerous. Therefore, an operator cannot memorize the relationships between failure phenomena and failure causes, and thus operational efficiency with regard to failure diagnosis is significantly deteriorated.

For example, using FIG. 9 as an example, when operation of the motor 107 has failed, the cause can be derived from failure of the motor 107 per se as well as failure of ECU 103, failure of ECU 101 route (including switch 105), failure of ECU 102 route (including switch 106), and failure of other communication system. Actually, relationships between failure phenomena and failure causes are extremely numerous. Further, there are a number of more complicated relations and operational burden is significantly applied to an operator conducting a failure diagnosis.

Therefore, the present invention has been conceived in view of the above-described problems, and it is an object thereof to provide a failure diagnosis apparatus and a failure diagnosis method of a vehicular electronic control system capable of diagnosing failure of a communication element (electronic control related member) which is not provided with self diagnosis function and failure of a signal transmitting system, and capable of analyzing a temporary drawback by instantaneous disconnection of a signal line or the like to thereby enable examination of failure cause more clearly.

SUMMARY OF THE INVENTION

In order to achieve the above-described object, according to one aspect of the present invention, a failure diagnosis apparatus for diagnosing a failure in a vehicular electronic control system, includes: a plurality of electronic control related members including electronic control apparatus mounted on a vehicle and controllers for electronically controlling the electronic control apparatus; a multiple communication system including a multiple communication line connected to the plurality of electronic control related members as communication elements; an input portion; and a signal analyzing portion, wherein communication signal information is received from the multiple communication line by way of the input portion connected to the multiple communication line, and the failure is diagnosed by analyzing the communication signal information at the signal analyzing portion. The signal analyzing portion is provided with a first and a second failed portion specifying means. In the first failed portion specifying means, a region which may have failed in the multiple communication system is specified from the communication signal information based on presence or absence of communication by the plurality of electronic control related members. In the second failed portion specifying means, the electronic control related member which may have failed in the plurality of electronic control related members is specified based on data content of the communication signal provided from the communication signal information.

Therefore, first, the multiple communication region which may have failed in the multiple communication system is specified from the communication signal information based on presence or absence of communication by the communication elements, the communication element which may have failed in the communication elements is specified based on the data content of the communication signal provided from the communication signal information. Therefore, by the diagnosis based on presence or absence of communication, there can be determined failure of a signal transmission system such as signal inputting and outputting systems of the multiple communication line and the respective communication elements connected thereto, and the failed communication element can be specified by diagnosis based on whether the data content of the communication signal is proper. Therefore, by utilizing the communication signal information, the failure diagnosis can be carried out efficiently and accurately and cause of failure can be predicted easily and more clearly.

Further, according to another aspect of the present invention, a failure diagnosis apparatus for diagnosing a failure in a vehicular electronic control system, includes: electronic control apparatus mounted on a vehicle; a plurality of electronic control related members including controllers for electronically controlling the electronic control apparatus; a multiple communication line connected to the controllers and the plurality of electronic control related members as communication elements; a recording portion, a detecting portion; and a display portion. The recording portion records states of the electronic control apparatus and proper value data of the plurality of electronic control related members with regard to the states of the electronic control apparatus in correspondence with each other. The detecting portion detects respective states of the plurality of electronic control related members based on communication signal information received from the multiple communication line. The display portion displays the proper value data recorded in the recording portion and detected data detected by the detecting portion and either of the proper value data recorded in the recording portion and the detected data detected by the detecting portion. Therefore, when there is a drawback in a certain electronic control apparatus, with regard to the controller for electronically controlling the electronic control apparatus as well as other electronic control related member for electronically controlling the electronic control apparatus, failure can easily be diagnosed by referring to the proper value data or the detected data displayed in the display portion.

Further, according to yet another aspect of the present invention, failure can be diagnosed more easily by specifying and displaying data of the detected data of the plurality of electronic control related members different from the proper value data recorded in the recording portion such that the data can be discriminated from other data.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An explanation will be given of preferred embodiments according to the present invention in reference to the drawings as follows.

Figure 1:
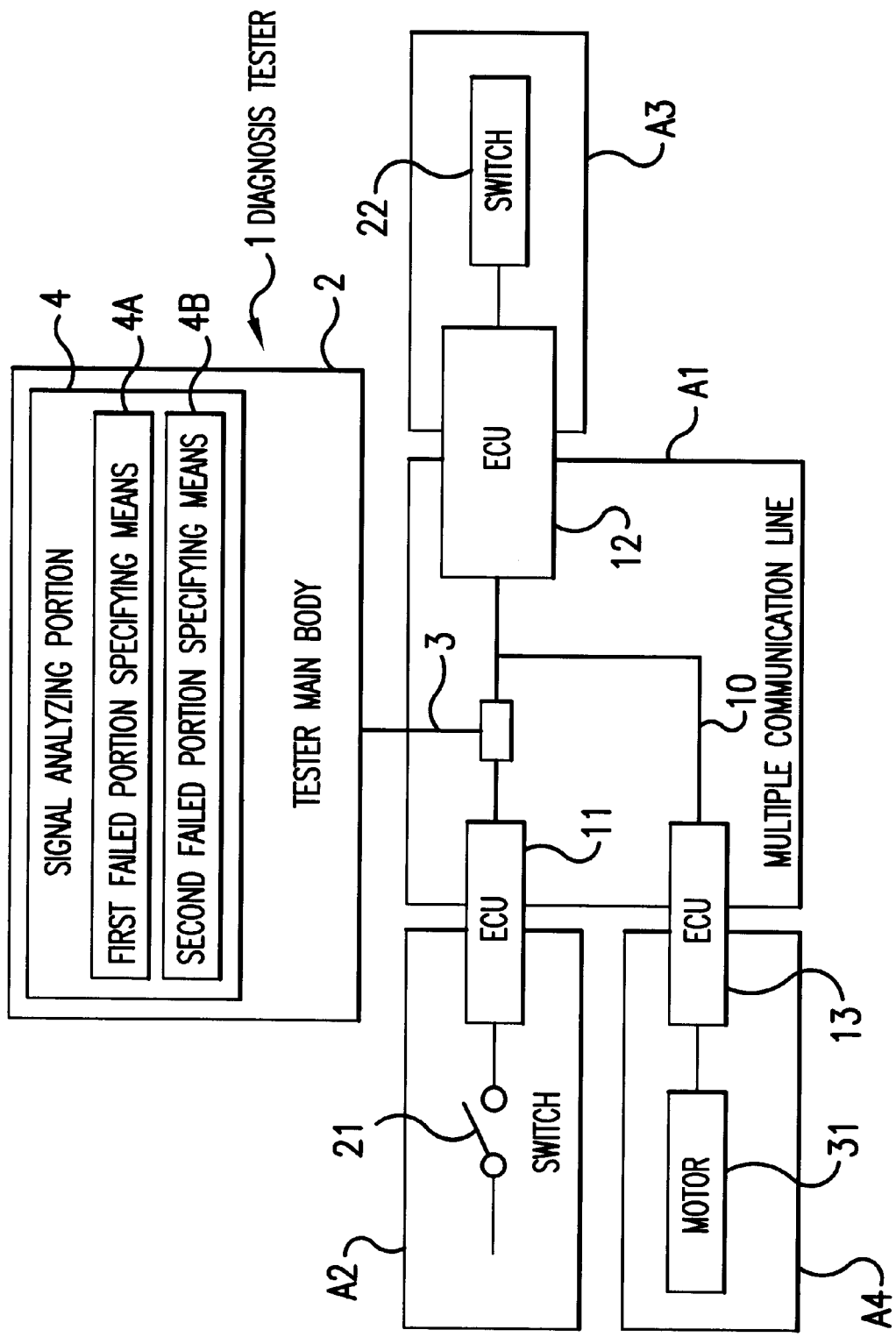
FIG. 1 is a block diagram schematically showing a constitution of a failure diagnosis apparatus of a vehicular electronic control system according to an embodiment of the present invention.

FIG. 1 through FIG. 5(*b*) show a failure diagnosis apparatus and a failure diagnosis method of a vehicular electronic control system according to an embodiment of the invention, and FIG. 1 is a schematic block diagram of the failure diagnosis apparatus.

The failure diagnosis apparatus and the failure diagnosis method are applied to a vehicular electronic control system constituted by a plurality of electronic control apparatus mounted on a vehicle such as an automobile and a multiple communication system constituted by connecting the respective electronic control apparatus by a bus communication line (multiple communication line).

FIG. 1 is a schematic block diagram showing a state of applying the failure diagnosis apparatus to the vehicular electronic control system. As shown in FIG. 1, the multiple communication system according to the failure diagnosis apparatus is provided with a bus communication line 10 and a plurality of communication elements 11 through 13 connected to the bus communication line 10. Information can be transmitted and received among the respective communication elements 11 through 13 by multiple communication by way of the bus communication line 10. As shown in, for example, FIG. 4, a data frame of multiple communication by way of the bus communication line 10 is constituted by SOM (start portion), address, data, CRC (check portion), and EOM (end portion), and a data signal, SOM and EOM are constituted as illustrated.

As shown in FIG. 1, as communication elements directly connected to the bus communication line 10, there are ECUs (electronic control units) constituting controllers as electronic control related members of a vehicle as well as electronic control related members such as switches, sensors, and the like, and electronic control apparatus such as motors (these are regarded as kinds of electronic control relates members). Further, in this case, switches 21 and 22 are connected to a first ECU 11 and a second ECU 12, respectively, and a motor 31 constituting an electronic control apparatus (electronic control related member) is connected to a third ECU 13.

The failure diagnosis apparatus (diagnosis tester) 1 is directly connected to the bus communication line 10 and used for diagnosing a state of such a vehicular electronic control system, for example, states of electronic control related members constituting communication elements and a state of a signal transmitting system such as the bus communication line 10.

The diagnosis tester 1 is provided with a tester main body 2 and a vehicle connecting harness (input portion) 3 for connecting the tester main body 2 to the bus communication line 10, and the tester main body 2 is provided with a function of analyzing communication signal information (signal analyzing portion) 4. Further, the signal analyzing portion 4 is provided with first failed portion specifying means 4A for specifying a multiple communication region which may have failed in a multiple communication system based on presence or absence of communication by respective communication element from communication signal information, and second failed portion specifying means 4B for specifying a communication element which may have failed in communication elements based on whether data content of a communication signal provided from communication signal information is proper when it is determined that there is no concern of failure in any region of the multiple communication system by the first failed portion specifying means 4A.

Figure 2:
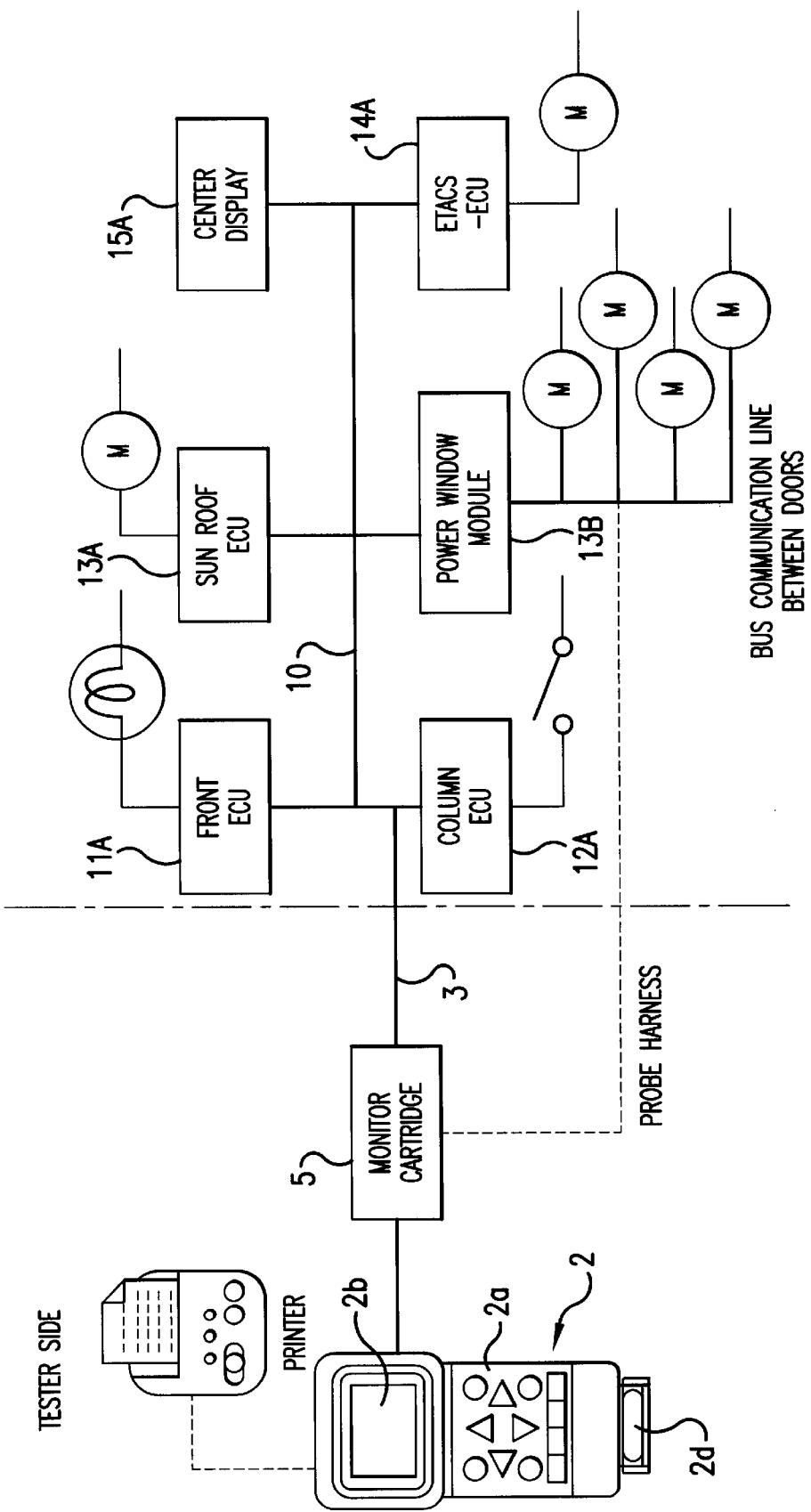
FIG. 2 is a block diagram further specifically showing the constitution of the failure diagnosis apparatus of the vehicular electronic control system according to the embodiment of the invention.

Describing more specifically by an example of a vehicular electronic control system provided around a column switch, as shown by FIG. 2, an ECU constituting a communication element directly connected to the bus communication line 10, is provided with a front ECU 11A, a column ECU 12A, a sun roof ECU 13A, a power window module ECU 13B, and an ETACS-ECU 14A, and is provided with a center display 15A as other communication element.

Further, the front ECU 11A controls electronic control apparatus at a front portion of a vehicle and connected with lamps such as head lamp, tail lamp, fog lamp and the like, and front wiper as electronic control apparatus constituting control objects. The column ECU 12A is connected to switches such as head lamp switch, tail lamp switch, window shield wiper switch (intermittent, low speed, high speed), washer switch, turn signal switch, and so on. The sun roof ECU 13A is connected with sun roof switch. The power window module ECU 13B is connected to power window switch and power window lock switch, and connected with respective power window motors constituting electronic control apparatus as control objects. The ETACS is a system for producing various timer functions. An alarm functions and ETACS-ECU 14A is connected to switches such as ignition switch, hazard switch, door switch, and the like and sensors such as vehicle speed sensor and so on, and connected to electronic control apparatus such as room lamp, power window relay, and so on as control objects.

Further, although not illustrated, there is a case in which operating apparatus such as motor, switches, and sensors are directly connected to the bus communication line 10 as communication elements other than ECU.

Although the above-described electronic control apparatus constituting the control objects are controlled by ECUs (controllers) respectively connected therewith, in this case, controlling ECU may control electronic control apparatus of control objects based on respective information including information from sensors and switches directly connected thereto as well as information from sensors and switches transmitted directly by way of the bus communication line 10 or by way of other ECU.

Figure 3:
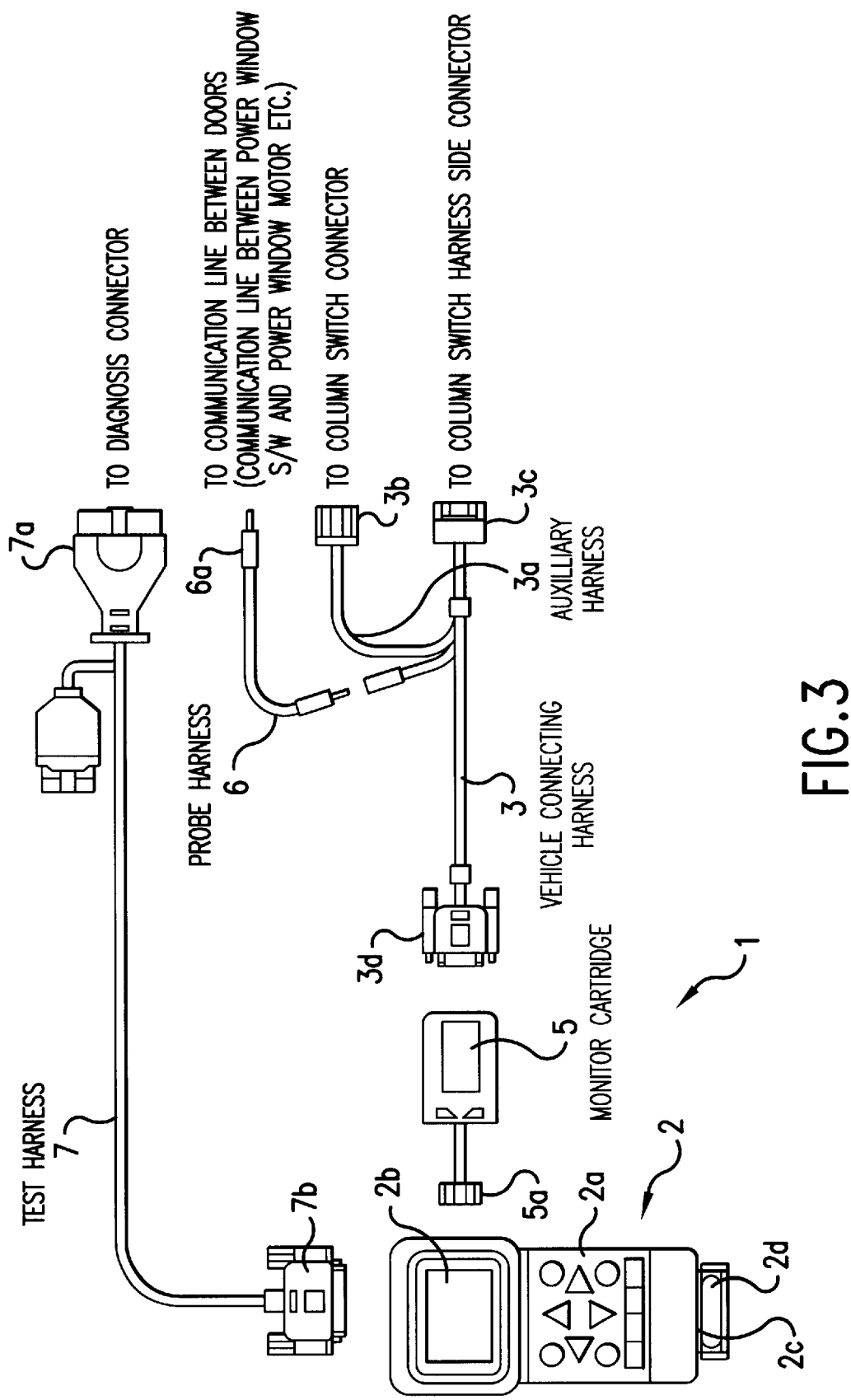
FIG. 3 is a view showing constitutions of essential portions of the failure diagnosis apparatus of the vehicular electronic control system according to the embodiment of the invention.
Figure 4:
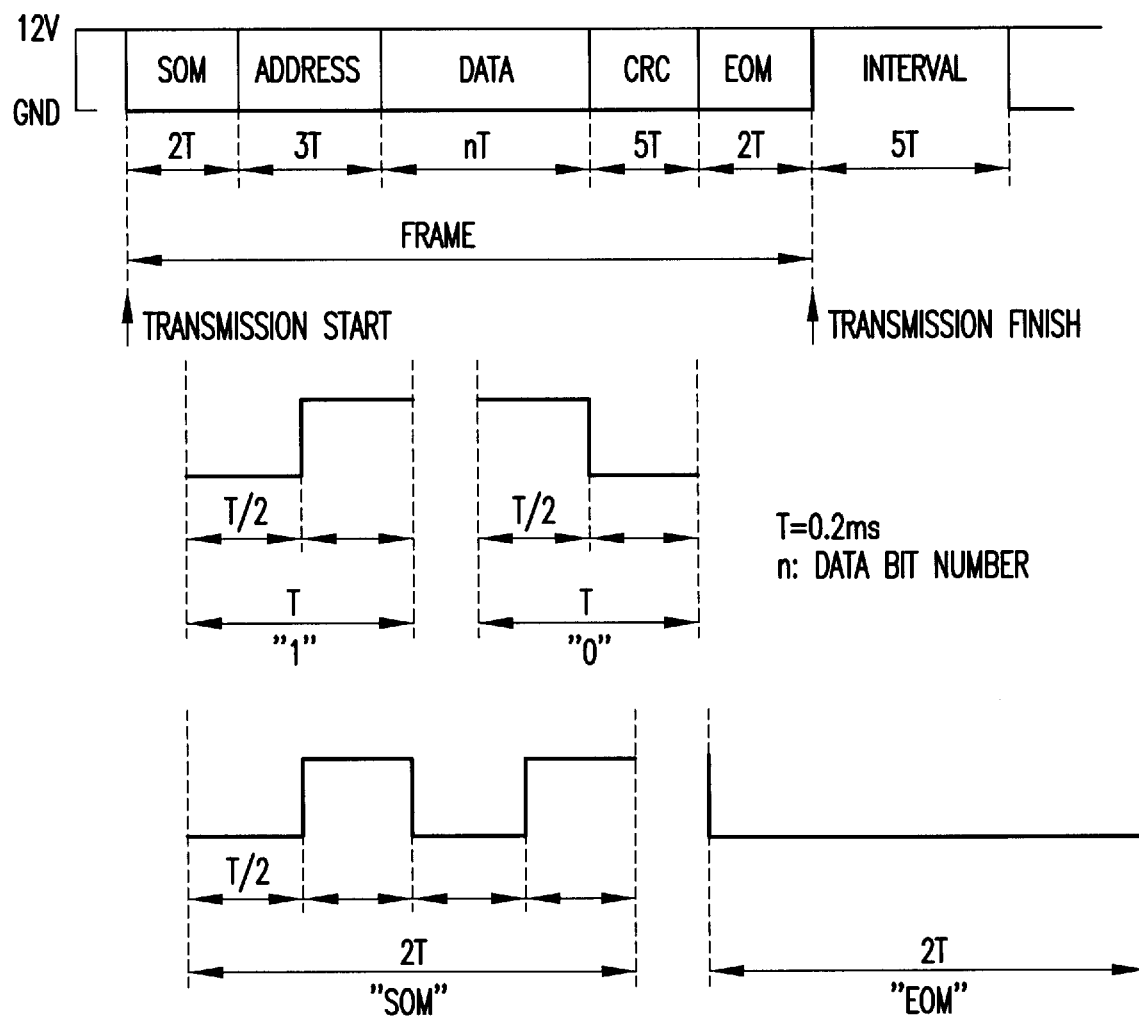
FIG. 4 is a diagram showing a data frame constitution of multiple communication in the failure diagnosis apparatus of the vehicular electronic control system according to the embodiment of the invention.

Meanwhile, as shown by FIG. 2 and FIG. 3, the tester main body 2 of the diagnosis tester 1 is provided with an operating portion 2*a* and a display portion 2*b* for displaying diagnosis content, diagnosis object or the like. The tester 1 is used by attaching a monitor cartridge 5 including an operational processing apparatus functioning as the signal analyzing portion 4, and an ROM pack 2d recorded with data related to failure diagnosis. The monitor cartridge 5 and the ROM pack 2d, in accordance with diagnosis object (vehicle kind of diagnosis portion) or diagnosis content, are selected and attached. Naturally, modes of the operational processing means and data recording means, mounted to the tester main body 2, are not limited thereto. Further, the tester main body 2 is pertinently connected with a printer.

Further, although according to the embodiment, the tester main body 2 is mounted with an IC card 2c having a function of recording diagnosis data, the IC card 2c may include an operational processing apparatus functioning as the signal analyzing portion 4.

An auxiliary harness 3a is connected to a front end of the vehicle connecting harness 3 and both ends of the auxiliary harness 3a are provided with a first connector 3b connected to a column switch connector and a second connector 3c connected to a connector on the side of the column switch harness and the auxiliary harness 3a can be interposed by disengaging the column switch connector and the connector on the side of the column switch harness.

Further, a third connector 3d coupled to a connector of the monitor cartridge 5 is mounted on a base end of the vehicle connecting harness 3. The monitor cartridge 5 is connected to the tester main body 2 by coupling a connector 5a to a connector on the side of the tester main body 2.

Further, according to the embodiment, a probe harness 6 can be connected to a front end of the vehicle connecting harness 3 in parallel with the auxiliary harness 3a. A probe 6a is provided at a front end of the probe harness 6 and the bus communication line 11 between doors can also be diagnosed by plugging the probe 6a into, for example, a required portion of the bus communication line 11 between doors.

Figure 9:
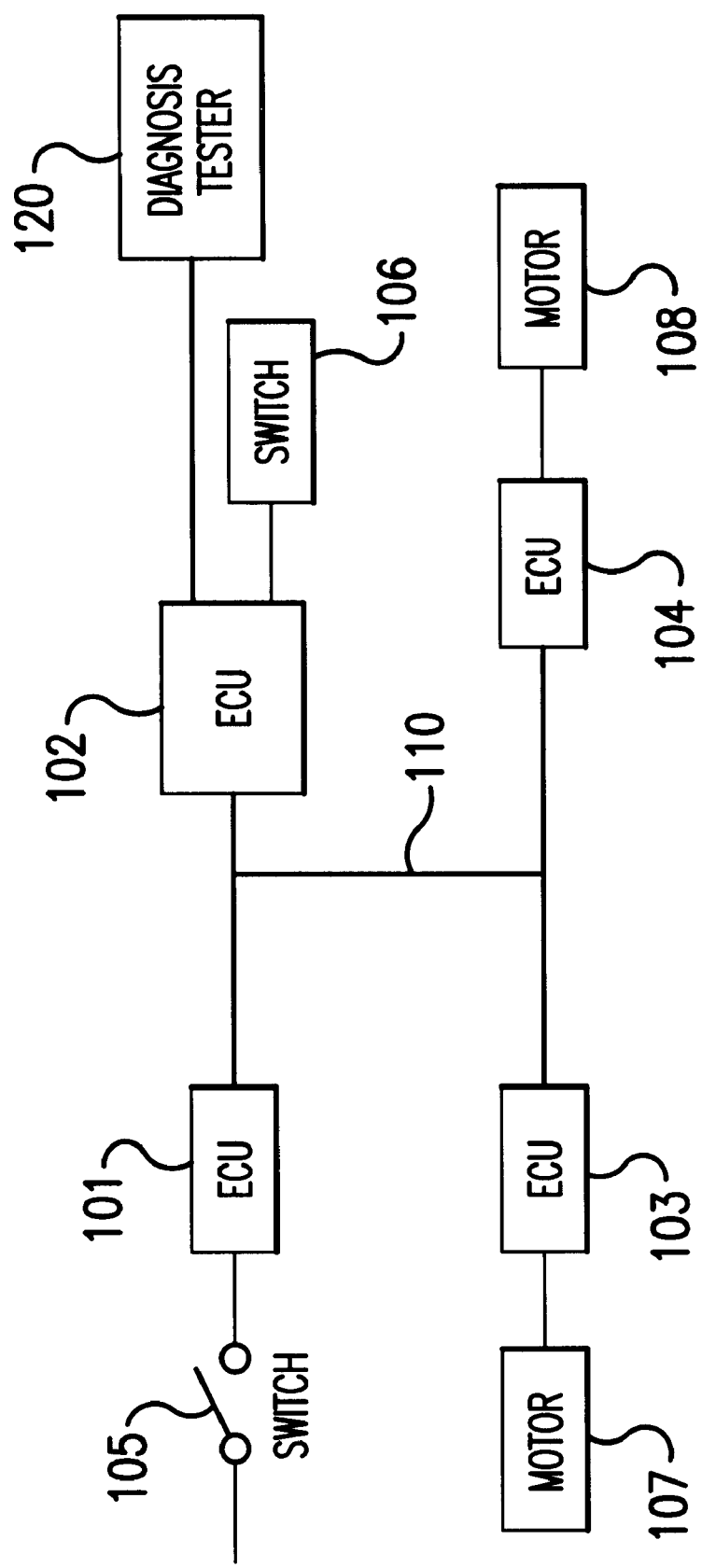
FIG. 9 is a block diagram schematically showing a constitution of a conventional failure diagnosis apparatus of a vehicular electronic control system.

The diagnosis tester 1 according to the embodiment is constituted by adding the above-described constitution (monitor cartridge 5, ROM pack 2d, vehicle connecting harness 3) to an apparatus for receiving self diagnosis information from respective communication element (ECU) by way of ECU as a gateway as in the conventional example (refer to FIG. 9). The tester 1 can receive self diagnosis information as in the conventional example by connecting a connector 7a of a test harness 7 to a diagnosis connector of gateway ECU and connecting a connector 7b of the test harness 7 to a connector of the tester main body 2.

Figure 5A:
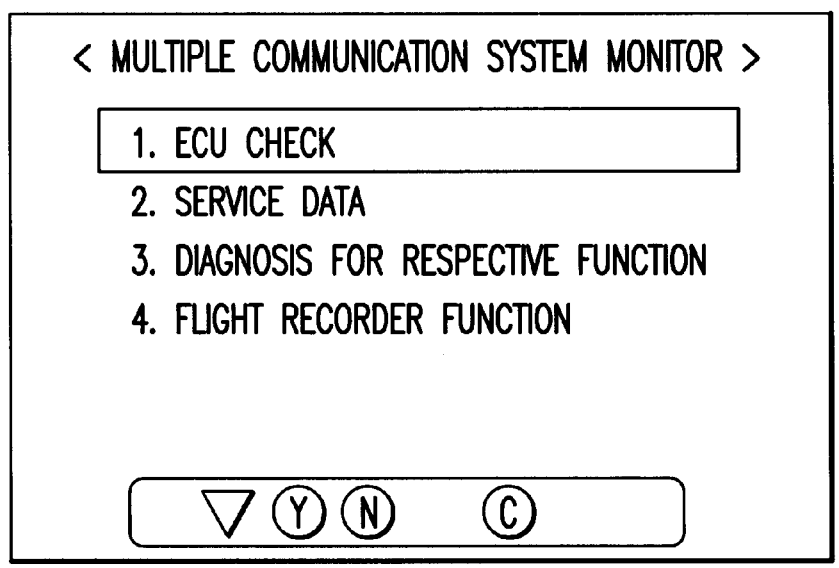
FIG. 5(*a*) and FIG. 5(*b*) are diagrams showing a display example of the failure diagnosis apparatus of the vehicular electronic control system according to the embodiment of the invention, showing the display example in a hierarchy in an order of FIG. 5(*a*) and FIG. 5(*b*)

A characteristic monitor function of a multiple communication system, among various functions of the diagnosis tester 1, will be described hereinafter. After the diagnosis tester 1 is connected to the bus communication line 10, the operating portion 2a is operated and multiple communication system monitor is selected from a menu screen displayed on the display portion 2b. A menu screen is further displayed as shown by FIG. 5(a). The menu is prepared with ECU check, service data, diagnosis for respective function and flight recorder function and when ECU check is selected here, as shown by FIG. 5(b), a table of respective ECUs (communication elements) is displayed and communication states of respective ECUs (communication element) are displayed.

Figure 5B:
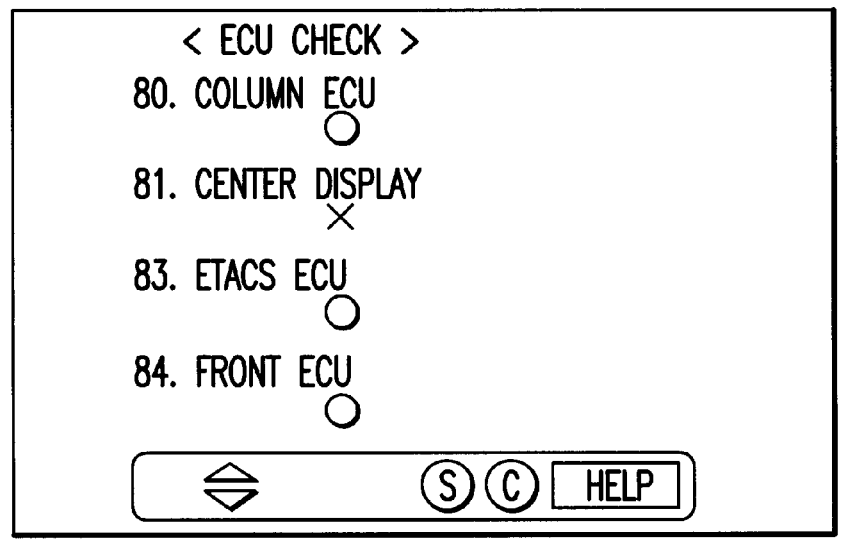

According to an example of ECU check shown in FIG. 5(b), it is shown that communication is currently carried out normally at column ECU 12a, ETACS-ECU 14A, and front ECU 11A by O marks and it is also shown that communication is currently abnormal at center display 15A by x mark. Determination of communication state in this case can be carried out by checking address of respective data frame (refer to FIG. 4) and is carried out by the function element (first failed portion specifying means) 4A of the signal analyzing portion 4 and a region which may have failed is specified in the multiple communication system.

Further, according to the function of service data in the menu of the multiple communication system monitor, communication data on the bus communication line 10 is displayed in the form of a table or a graph by a control amount (ON/OFF, time (second) etc) for respective ECU (communication element).

Figure 6A:
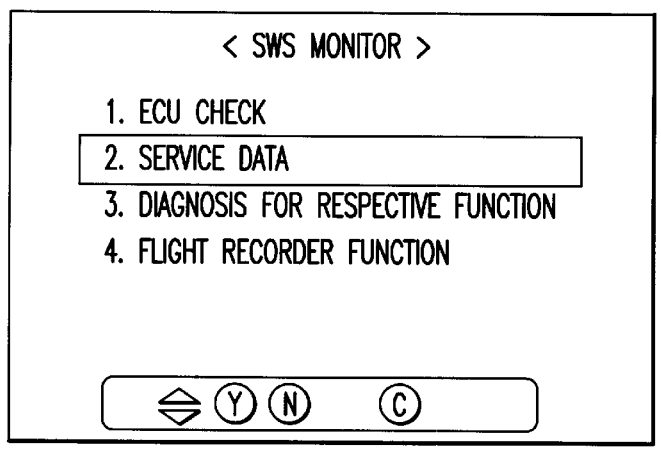
FIGS. 6(*a*), 6(*b*), and 6(*c*) are diagrams showing a display example of the failure diagnosis apparatus of the vehicular electronic control system according to the embodiment of the invention, showing the display example in a hierarchy in an order of FIG. 6(*a*), FIG. 6(*b*)
Figure 6B:
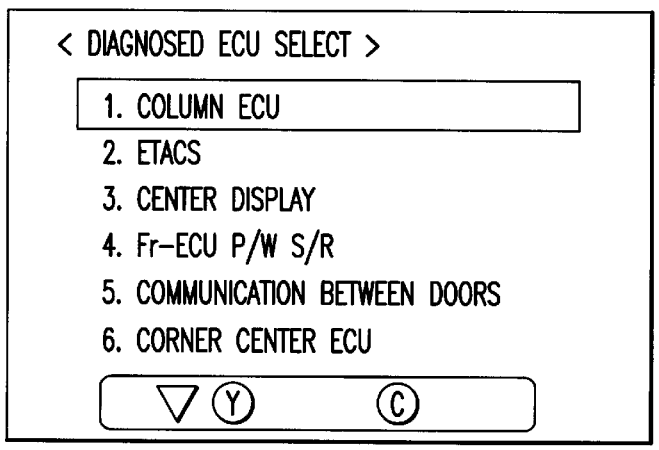
Figure 6C:
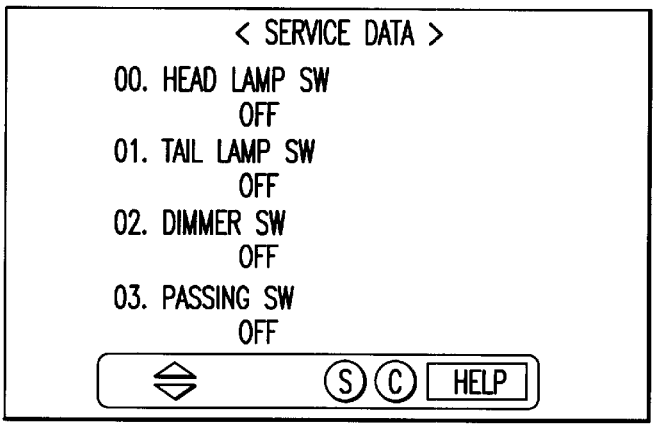

Therefore, when service data is selected from the menu of the multiple communication system monitor as shown by FIG. 6(a), the menu screen for selecting ECU (communication element) constituting a diagnosis object is displayed as shown in FIG. 6(b). When a certain ECU (communication element) is selected here, a title of selected ECU and service data of switches transmitted from the ECU are displayed in real time. For example, when the column ECU 12A is selected, communication data with regard to the column ECU 12A on the bus communication line 10 and control amounts (ON/OFF, time (second) etc) transmitted from the column ECU 12A are displayed in a table as shown by FIG. 6(c).

Further, according to the function of diagnosis for respective function in the menu of the multiple communication system monitor, the above-described service data (detected data) is displayed in a form of a table or a graph for respective item of respective function (electronic control apparatus).

That is, when a problem is caused in a certain function (electronic control apparatus) mounted on a vehicle, the function (electronic control apparatus) and content of the problem (that is, item) can be specified. The cause of the problem may be present at any of respective elements such as the function (electronic control apparatus) per se producing the problem, ECU controlling the function, other ECU related to control of the function, and switches or sensors related to control of the function. The relationships between the problem and the respective elements (electronic control related members) related to the problem are complicated, and there are a number of phenomena of the problem which can occur. Therefore, it is extremely difficult for an operator to memorize or grasp them according to the manual. Hence, according to the apparatus, relationships between a certain phenomenon (which can be specified by function (electronic control apparatus and content of operation (item)) and respective elements (electronic control related members) related to the phenomenon, are formed into a database. When the function (electronic control apparatus) and the content of operation (item) are specified, respective elements (electronic control related members) related thereto and service data of the elements can be outputted from the database and displayed in a form of a table.

Further, Table 1 shows an example of data content recorded in the database as follows. The example shows titles of service data and normality criteria thereof of all items (electronic control related members) respectively related to cases of title of function of windshield wiper, titles of items of intermittent, low speed, and high speed.

TABLE 1

| Function | Item | Item No. | Title of service data | Normality Criteria |
|---|---|---|---|---|
| Window-shield Wiper | INT (Intermittent) | 05 | Windowshield intermittent wiper switch | ON |
| | | 06 | Windowshield low speed wiper switch | OFF |
| | | 07 | Windowshield high speed wiper switch | OFF |
| | | 08 | Windshield mist wiper switch | OFF |
| | | 09 | Windowshield washer switch | OFF |
| | | 31 | Ignition switch (ACC) | ON |
| | | 37 | Windshield intermittent wiper time (ver.2 is not displayed) | Display intermittent time in conformity with volume position of intermittent wiper |
| | | 70 | Front ecu response (ver.2 is not displayed) | Normal response or high beam response |
| | LO (Low Speed) | 05 | Windshield intermittent wiper switch | OFF |
| | | 06 | Windshield low speed wiper switch | ON |
| | | 07 | Windshield high speed wiper switch | OFF |
| | | 08 | Windshield mist wiper switch | OFF |
| | | 09 | Windshield washer switch | OFF |
| | | 31 | Ignition switch (ACC) | ON |
| | | 70 | Front ecu response (ver 2. Is not displayed) | Normal response or high beam response |
| | HI (High Speed) | 05 | Windshield intermittent wiper switch | OFF |
| | | 06 | Windshield low speed wiper switch | OFF |
| | | 07 | Windshield high speed wiper switch | ON |
| | | 08 | Windshield mist wiper switch | OFF |
| | | 09 | Windshield washer switch | OFF |
| | | 31 | Ignition switch (ACC) | ON |
| | | 70 | Front ecu response (ver.2 is not displayed) | Normal response or high beam response |

Figure 7A:
FIGS. 7(*a*), 7(*b*), 7(*c*), 7(*d*), and 7(*e*) are diagrams showing a display example of the failure diagnosis apparatus of the vehicular electronic control system according to the embodiment of the invention, showing the display example in a hierarchy in an order of 7(*a*), 7(*b*)
Figure 7B:
Figure 7C:

Therefore, when diagnosis for respective function is selected from the menu of the multiple communication system monitor as shown in FIG. 7(a), a menu screen for selecting functions (electronic control apparatus) to be monitored (diagnose) is displayed as shown in FIG. 7(b). When a certain function (electronic control apparatus) is selected here, as shown in FIG. 7(c), a title of the selected function (electronic control apparatus) and items with regard to the function are displayed.

Figure 7D:
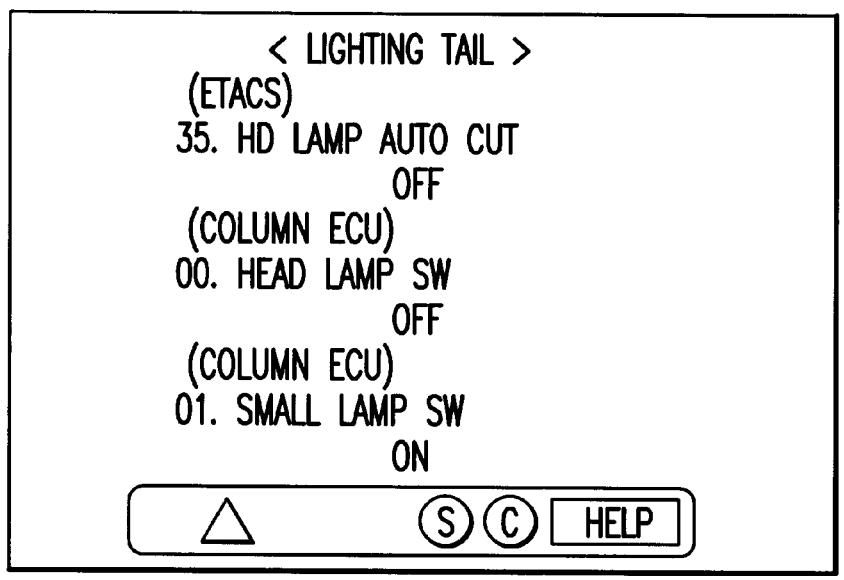
Figure 7E:
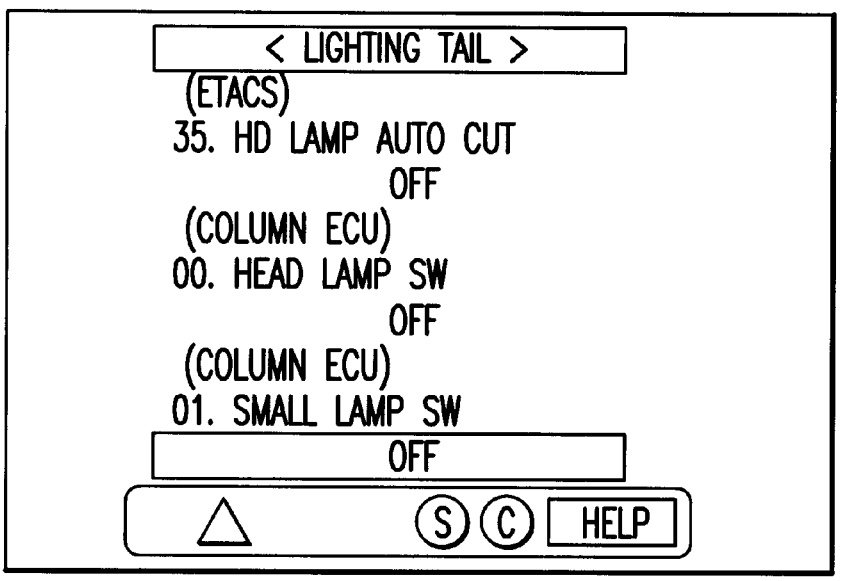

When a certain item is further selected here, as shown by FIG. 7(d), a title of the selected function (electronic control apparatus), a title of the selected item, and service data for operating the item are displayed for respective transmitting ECU. At this occasion, respective service data is displayed in real time based on content of data of a communication signal provided from communication signal information and when there is abnormality in the respective service data, as shown by FIG. 7(e), display of the service data is invertedly displayed to be able to discriminate from other along with title of function (title of electronic control apparatus) and title of item. According to the example shown in FIG. 7(e), it is shown that abnormality is present in the tail lamp switch.

Abnormality of the service data can be determined by whether the detected service data coincides with normal value data stored on database of ROM pack 2d and the like. That is, the database is stored with proper amounts (ON/OFF, time (second) etc.) of states of switches transmitted from respective ECU related to respective functions and items in accordance with combinations of respective functions (electronic control apparatus) and respective items. The processing apparatus compares the normal value data stored in the database with the detected service data and carries out an inverted display as abnormal when they do not coincide with each other.

The inverted display is only an example for identifying and displaying an abnormal portion. The display may be those capable of discriminating an abnormal portion from other by blinking or by classification of colors or by adding a specific mark.

Further, a flight recorder function (refer to FIG. 5(a)) is a function of recording communication data of ECU check, service data, and diagnosis for respective function to a memory provided in or connected to the tester main body 2.

Figure 8A:
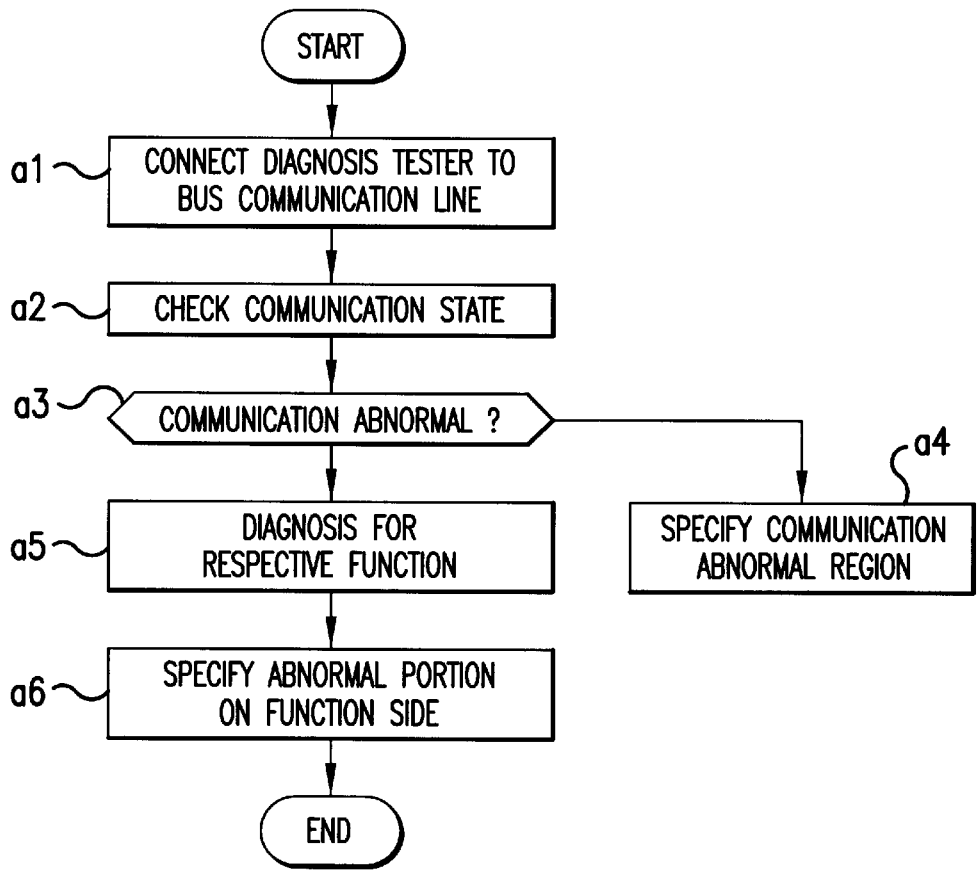
FIGS. 8(*a*) and 8(*b*) are flowcharts showing a failure diagnosis method of a vehicular electronic control system according to an embodiment of the invention in which FIG. 8(*a*) shows a main routine thereof and FIG. 8(*b*) shows a subroutine thereof.
Figure 8B:
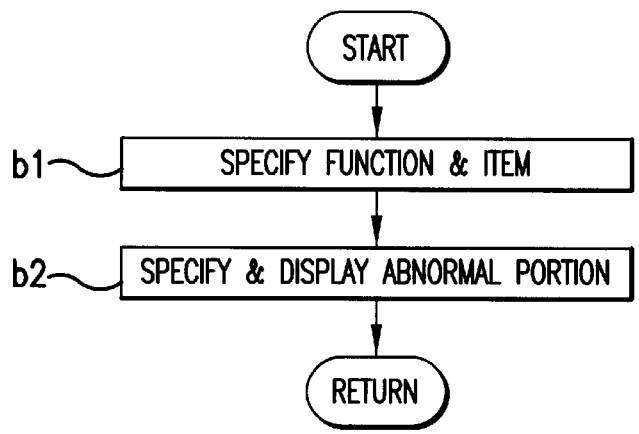

The failure diagnosis apparatus of the vehicular electronic control system according to the embodiment of the present invention is constituted as described above and therefore, failure diagnosis can be carried out as shown in, for example, FIGS. 8(a) and 8(b).

That is, when some problem is caused in a certain function (electronic control apparatus) mounted on a vehicle, as shown by FIG. 8(a), the diagnosis tester 1 is connected to the bus communication line 10 to thereby enable to receive communication information (step a1, receiving step) and the communication state is checked (step a2, receiving step). In checking the communication state, the operating portion 2a is operated, the multiple communication system monitor is selected from a menu screen displayed on the display portion 2b, and ECU check is selected from a menu screen at a lower level (FIG. 5(a)). Thereby, according to the diagnosis tester 1, address of respective data frame (refer to FIG. 4) is checked and communication states of respective ECUs (communication elements) are displayed and ECU currently having abnormality in communication is displayed to be able to discriminate from other (for example, by x mark) (refer to FIG. 5(b)). At this stage, when abnormality is currently present in communication, the operation proceeds from step a3 to step a4, and specifies a region which may have failed in the multiple communication system (first failed portion specifying step). In this case, a corresponding portion of the communication system may be checked, interchanged or repaired.

Meanwhile, when abnormality is not currently present in communication, failure diagnosis for respective function is carried out based on data content of a communication signal provided from communication signal information (step a5) and an electronic control related member which may have failed is specified (step a6, second failed portion specifying step).

According to diagnosis for respective function of step a5, as shown in FIG. 8(b), a function (electronic control apparatus) causing a problem and content (item) of the problem are specified (step b1). That is, the operating portion 2a is operated and diagnosis for respective function is selected from the menu screen displayed on the display portion 2b (FIG. 7(a)), the function (electronic control apparatus) is selected from the lower menu screen (FIG. 7(b)), and the item is selected from the successive menu screen (FIG. 7(c)). In this case, the selected function and item (that is, failed function and item) are pertinently set to a state of causing failure. According to the diagnosis tester 1, it is determined whether the detected service data coincides with the normal value data stored in the database and when they do not coincide with each other, the inverted display (specifying of abnormal portion) is carried out as abnormal (step b2). In this case, the corresponding portion may be checked, interchanged or repaired.

In this way, first, it is determined whether there is present a failure in the multiple communication system based on presence or absence of communication by the communication element from the communication signal information. At this stage, when the failure is present, the multiple communication region which may have failed can be specified as in region A1 of FIG. 1. In this case, it can be specified that there is present a cause of failure in any of the bus communication line 10, terminals of ECU 11 through 13 connected to the bus communication line 10, and systems of inputting and outputting communication signals of ECU 11 through 13. Further, cause of failure can be specified from an occurrence state of failure. For example, when there is present a failure in operation of the motor 31, and it is found that there is present a failure in the multiple communication system, it can be specified that there is present the cause of failure in any of the bus communication line 10, terminals of ECU 13, and the system of inputting, and outputting the communication signal of ECU 13.

Meanwhile, at this stage, when it is determined that there is no failure in any region of the multiple communication system, a communication element which may have failed in communication elements (for example, any of regions A2, A3, A4 of FIG. 1) is specified based on data content of the communication signal provided from the communication signal information. Further, at this stage, when there is no abnormality present in data content of the communication signal, it can be specified that the electronic control apparatus (for example, motor) per se causing the problem has failed.

In this way, by utilizing the communication signal information, failure diagnosis can be carried out efficiently and accurately, and cause of failure can be predicted easily and more clearly.

Particularly, since the communication signal information is utilized in real time, failure of a communication element or failure of a signal transmitting system which is not provided with self diagnosis function can be diagnosed. Further, an electronic control related member can be diagnosed while operating the member. Therefore, a temporary problem caused by instantaneous disconnection of a signal line can be analyzed.

Further, when some problem is caused in a certain function (electronic control apparatus), the function (electronic control apparatus) and content (that is, item) of the problem can be specified. As the cause of the problem, there are conceivable various elements such as the function (electronic control apparatus) per se causing the problem, ECU controlling the function, other ECU related to control of the function, and switches and sensors related to the control of the function. When the relationships are formed into the database and the function (electronic control apparatus) and content of operation (item) are specified, respective elements (electronic related members) related thereto and service data of the element are outputted from the database and displayed in the form of a table. Therefore, operational burden is significantly alleviated and diagnosis accuracy is remarkably promoted.

Further, database is stored not with enormous failure phenomena but normal values for respective functions and items and abnormality is detected by comparing the service data with the stored normal values. Therefore, failure can be detected easily and pertinently without applying heavy burden on the database and without complicating diagnosis logic.

The above-described embodiment is an example for explaining the invention and the embodiment can be executed by pertinently changing the embodiment within a range not deviated from the gist of the invention.

What is claimed is:

1. A failure diagnosis apparatus for diagnosing a failure in a vehicular electronic control system, comprising:
   a plurality of electronic control related members including electronic control apparatus mounted on a vehicle and controllers for electronically controlling the electronic control apparatus;
   a multiplex communication system including a multiplex communication line connected to the plurality of electronic control related members as communication elements;
   an input portion for receiving communication signal information from the multiplex communication line; and
   a signal analyzing portion for analyzing the communication signal information received via the input portion,
   the signal analyzing portion including
      first failed portion specifying means for specifying a region which may have failed in the multiple communication system from the communication signal information based on presence or absence of communication by the plurality of electronic control related members, and
      second failed portion specifying means for specifying the electronic control related member which may have failed in the plurality of electronic control related members based on a data content of a communication signal provided from the communication signal information.

2. The failure diagnosis apparatus according to claim 1, further comprising:
   a display portion,
   wherein the region specified by the first failed portion specifying means that the region may have failed is displayed differently from other normal region, and the electronic control related member specified by the second failed portion specifying means that the electronic control related member may have failed is displayed differently from other normal electronic control members.

3. A failure diagnosis apparatus for diagnosing a failure in a vehicular electronic control system, comprising:
   a plurality of electronic control related members including electronic control apparatus mounted on a vehicle and controllers for electronically controlling the electronic control apparatus;
   a multiplex communication system including a multiplex communication line connected to the plurality of electronic control related members as communication elements;
   a recording portion recorded with states of the electronic control apparatus and proper value data of the plurality of electronic control related members with regard to the states of the electronic control apparatus in correspondence with each other;

a detecting portion for detecting respective states of the plurality of electronic control related members based on communication signal information received from the multiplex communication line; and a display portion for displaying the proper value data recorded in the recording portion and detected data detected by the detecting portion, or either of the proper value data recorded in the recording portion and the detected data detected by the detecting portion.

4. The failure diagnosis apparatus according to claim 3, wherein the display portion specifies and displays data of the detected data of the plurality of electronic control related members different from the proper value data recorded in the recording portion such that the data can be discriminated from other data.

5. A failure diagnosis method for diagnosing a failure in a vehicular electronic control system including, a plurality of electronic control related members having electronic control apparatus mounted on a vehicle and controllers for electronically controlling the electronic control apparatus, and a multiple communication system having a multiple communication line connected to the plurality of electronic control related members as communication elements, said failure diagnosis method comprising:

receiving communication signal information from the multiplex communication line;

specifying a region which may have failed in the multiplex communication system from the communication signal information received in the receiving step based on presence or absence of communication by the plurality of electronic control related members; and specifying the electronic control related member which may have failed in the plurality of electronic control related members based on a data content of a communication signal provided from the communication signal information.

6. The failure diagnosis method according to claim 5, further comprising:

displaying the specified region differently from other normal regions and the specified electronic control related member differently from other normal electronic control related members.

7. A failure diagnosis method for diagnosing a failure in a vehicular electronic control system including a plurality of electronic control related members having electronic control apparatus mounted in a vehicle and controllers for electronically controlling the electronic control apparatus, and a multiple communication system having a multiple communication line connected to the plurality of electronic control related members as communication elements, said failure diagnosis method comprising:

recording states of the electronic control apparatus and proper value data of the plurality of electronic control related members with regard to the states the electronic control apparatus in correspondence with each other;

detecting respective states of the plurality of electronic control related members based on communication signal information received from the multiple communication line; and displaying the recorded proper value data and detected data detected by the detecting step, or either of the proper value data recorded by the recording step and the detected data detected by the detecting step.

8. The failure diagnosis method according to claim 7, wherein the displaying step includes the steps of specifying and displaying data of the detected data of the plurality of electronic control related members different from the proper value data recorded by the recording step such that the data can be discriminated from other data.

* * * * *